INVENTORS.
Gabor B. Levy
David M. Seltzer
BY
ATTORNEY

United States Patent Office 3,726,778
Patented Apr. 10, 1973

3,726,778
COULOMETRIC WATER TITRATOR
Gabor B. Levy, Westport, Conn., and David M. Seltzer, Little Neck, N.Y., assignors to Photovolt Corporation
Filed July 2, 1971, Ser. No. 159,428
Int. Cl. G01n 27/44
U.S. Cl. 204—195 T      6 Claims

ABSTRACT OF THE DISCLOSURE

An improved automatic coulometric titrating apparatus for coulometric titration of water is described. The device includes a coulometric generator having a cathode which provides a large area of contact between the catholyte and the titration mixture, a hydrostatic pressure differential between the titration mixture and the catholyte, and auxiliary bipolar baseline stabilizing means to compensate for both positive and negative baseline drift. The device can be vented directly to the atmosphere without loss of accuracy under ordinary conditions.

BACKGROUND OF THE INVENTION

The present invention is concerned with titration apparatus of the type used in determining the water content of various substances by titration with coulometrically generated Karl Fischer reagents. See Bizot, Bulletin de la Societe Chemique de France, 1967 (1), 151 (1967); Meyer and Boyd, Anal. Chem. 31, 215 (1959); and Swenson and Keyworth, Anal. Chem. 35, 863 (1963). In such titrations, a sample is mixed with an anhydrous reagent comprising sulfur dioxide, pyridine, and iodine source (usually iodide), and an anhydrous solvent, usually methanol, formamide, methyl Cellosolve or mixtures thereof. Automatic titrators include a means for coulometric generation of iodine such as constant current source, a cathode and anode, and a timer or the like for measuring the current passed through the titration mixture. The titrator has the configuration of an electrolysis cell, with the titration mixture of reagent and sample as the anolyte and anhydrous reagent as the catholyte, the anolyte and catholyte being in separate anode and cathode compartments connected via a porous glass frit or the like. The iodine generated coulometrically during the titration reacts with water according to the Karl Fischer reaction. The endpoint of the titration is detected by a modified "dead-stop" technique. For example, a pair of detector electrodes is immersed in the solution and a potential difference of a few millivolts is maintained between them. While unreacted water is present in the titration vessel, polarization of the cathode prevents current flow between the sensing electrodes. At the end point further electrolytically generated iodine depolarizes the cathode, permitting current flow between the sensing electrodes. The resulting current flow can be used to indicate that the endpoint has been reached by deflection of a microammeter needle, or suitable relays may be employed to shut off current to the coulometric generator and timer. Alternatively, the endpoint is determined potentiometrically.

The endpoint potential or current is selected to correspond to the presence of a predetermined concentration of unreacted iodine in the titration mixture, with the same endpoint being used as the baseline for successive titrations. In practice, due to the difficulty of maintaining absolutely anhydrous conditions in the anode compartment, production of water by said reactions between the sample and the anolyte reagent, or chemical reactions between the anolyte and catholyte, the endpoint baseline is known to drift. Various procedures such as minimizing contact between the anolyte and catholyte by minimizing frit area or porosity, addition of thickening agents, and using double barriers have proved unsatisfactory and unduly increase the resistance of the electrolysis cell. The anode compartment can be sealed to minimize exposure to atmospheric water, however, venting is generally necessary during the addition of samples. Application of a constant compensating current which generates sufficient iodine to compensate for drift has been employed to compensate for baseline drift manifested by depletion of iodine. Conventional water titrators generally include a constant current source to provide the added compensation current, generally connected in series with the main current source to the cathode and anode, and generally independent of the timer so that the compensating current does not add to the results of the titration.

SUMMARY OF THE INVENTION

This invention is directed to an improved apparatus for coulometric titration of water by the Karl Fischer reaction. More particularly, this invention is directed to an automatic coulometric titration apparatus having bipolar baseline stabilization means to provide compensation for base line drift in both directions from a predetermined endpoint. The improved apparatus also has an anode compartment which is continuously vented directly to the atmosphere. The apparatus also has a high area of contact between the anolyte (the titration mixture) and the catholyte while minimizing mixing therebetween. In addition to the known phenomenon of baseline drift toward increasing water concentration, and decreasing iodine concentration from the endpoint levels, it has been found that under some conditions the baseline may shift toward increasing iodine and decreasing water concentrations. Since the baseline drift toward increased water concentration is manifested by an increase in potential from the endpoint potential when a potentiometric detection system is employed, this component of drift will be referred to herein as "positive drift." The newly discovered component is manifested as a decrease from the endpoint potential, and will be referred to as "negative drift."

Negative baseline drift is a more serious problem than positive drift, since it leads to low analytical results, and since the error cannot be readily predicted. In view of the known tendency of the Karl Fischer reagent to pick up atmospheric moisture, resulting in positive baseline drift, the phenomenon of negative baseline drift is unexpected.

The improved device of the invention includes means for passing an intermittent auxiliary current through the titration mixture to compensate for baseline drift. The auxiliary current means is bipolar, and can thus compensate for either positive or negative baseline drift. In a preferred embodiment, the bipolar auxiliary current means utilizes the same anode and cathode as are employed in the titration, and the same sensing electrodes are utilized to control the application and the polarity of the auxiliary current. The device also includes means for switching off the auxiliary current when the main electrolysis current is on. The auxiliary current and the timer are independent of each other, so that the current employed in compensation for drift is automatically added or subtracted (depending on polarity) from the results.

In the improved apparatus, the titration mixture is shielded from exposure to ultraviolet (UV) light. The use of a UV opaque titration vessel reduces negative baseline drift, thus minimizing the current required for compensation. The apparatus of the invention also employs a cathode configuration which provides a greater degree of contact between the anolyte and catholyte liquids than is customarily employed, while minimizing the deleterious effects of mixing of the catholyte with the anolyte. In the apparatus of the invention, a porous barrier is employed to separate the anolyte titration liquid and the catholyte, and additionally a hydrostatic pressure head is maintained across the porous barrier to provide an additional barrier against migration of the catholyte into the anolyte. The use of a hydrostatic pressure barrier in conjunction with the structural barrier provides low electrolysis cell resistance, with reduced risks of side reactions influenced by heat, while minimizing baseline drift caused by migration of catholyte into the titration mixture.

DESCRIPTION OF THE PREFERRED EMBODIMENTS

Figure 1:
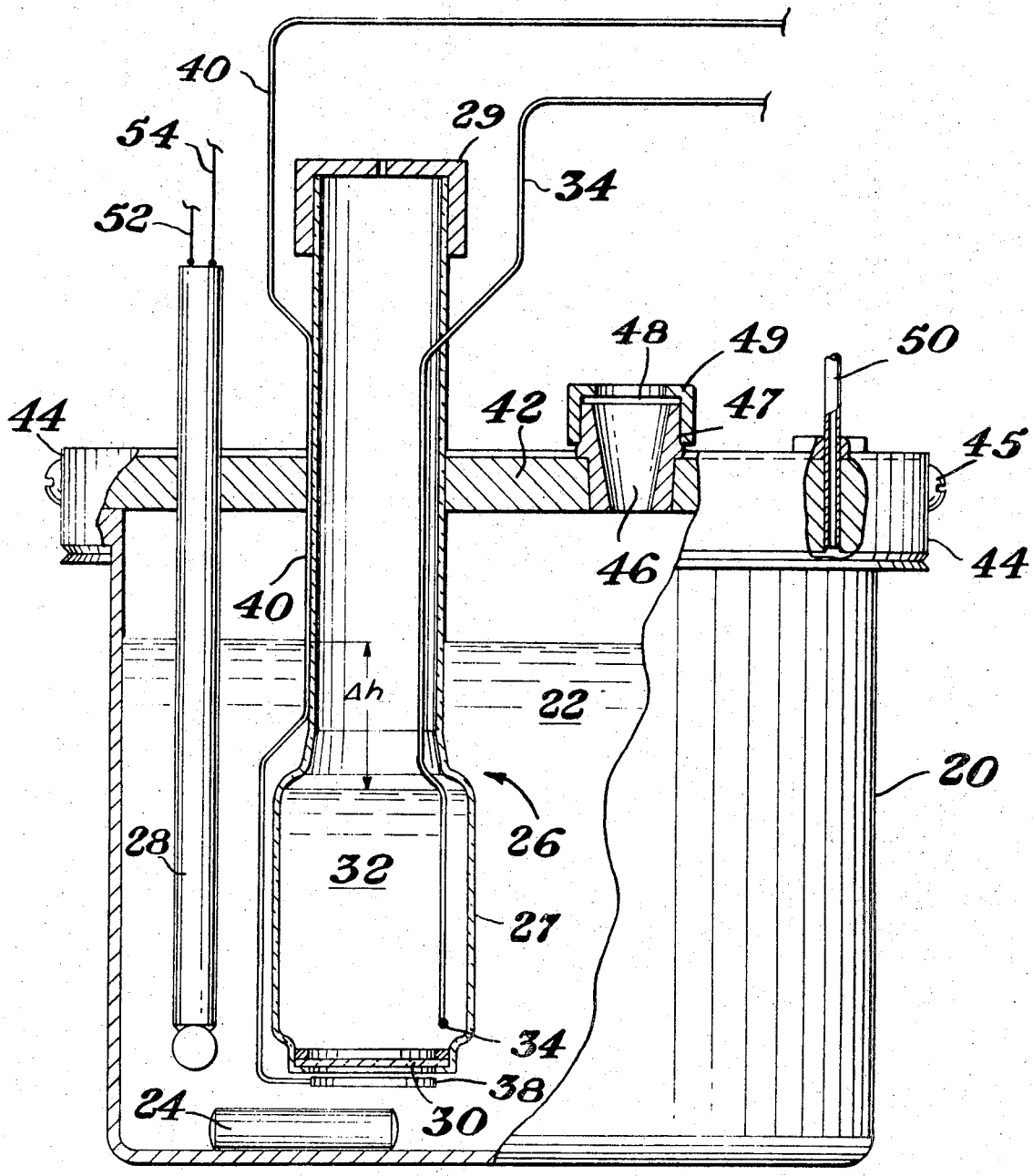
FIG. 1 is an elevational view illustrating the titration vessel and electrodes of an apparatus of the invention, partially broken away.
Figure 2:
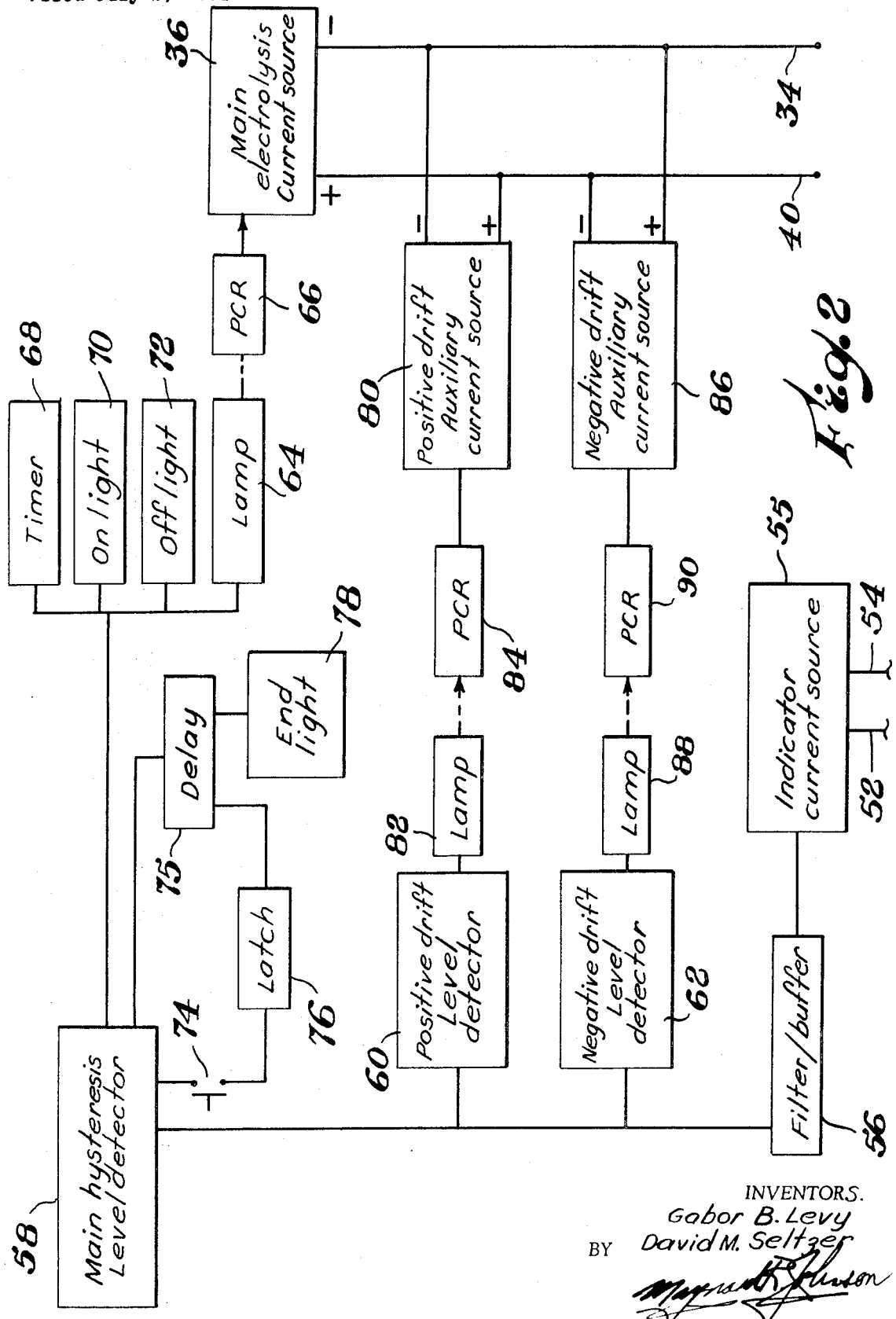
FIG. 2 is a diagram illustrating the operating and control circuitry of an apparatus of the invention.

With particular reference to FIGS. 1 and 2 the apparatus of the invention comprises a titration vessel 20, preferably of a material which is opaque to ultraviolet light, for containing a titration mixture 22, magnetic stirrer bar 24, coulometric generator 26, and indicator electrode assembly 28. The coulometric generator 26 includes an anode 38, a generally tubular cathode body 27 having a porous membrane 30 at an end thereof disposed within vessel 20 below the level of the titration mixture, anolyte 22, and having a liquid electrolyte, catholyte 32 enclosed therein. Cathode body 27 is releasably sealed at its other end by a removable cap 29 to permit addition or replacement of catholyte 32. A generator cathode lead 34 is disposed within the catholyte 32 in the generator 26 to provide electrical contact between the catholyte 32 and a constant current supply 36. The electrolysis circuit is completed by the coulometric generator anode 38. Anode 38 is mounted externally of the cathode body 27 and spaced therefrom, and is connected to the constant current supply 36 by an anode lead 40. Anode 38 is preferably planar and of about the same area as the cathode membrane 30. In a convenient embodiment, anode 38 can be a disk of platinum gauze. The anolyte 22 and catholyte 32 can be prepared as described by Meyer and Boyd, Anal. Chem. 31, 215 (1959).

The relative liquid levels of the catholyte 32 and anolyte 22, and the generator membrane 30 cooperate to provide particularly advantageous results in titration. The membrane 30 is adapted to provide electrical contact between the anolyte 22 and catholyte 32 over a relatively large area, such as from about 5 to about 15 square centimeters. The membrane preferably has a planar configuration, conveniently in the form of a disc of fritted glass or the like about one inch in diameter. The large membrane area provides lower resistance and reduces heating problems in the electrolysis, however, the resulting large area of contact between the catholyte 32 and anolyte 22 can lead to increasing problems of baseline drift. It has been found that baseline drift due to the area of contact can be minimized by providing a height differential (indicated as $\Delta h$ in FIG. 1) between the liquid levels of the anolyte 22 and catholyte 32. The level of anolyte 22 (the titration mixture) should be at least 30 millimeters above the level of the catholyte 32 in the generator 26. In general, good results with minimal baseline drift can be obtained with a height differential $\Delta h$ of from about 30 to about 50 millimeters (level of anolyte 22 above level of catholyte 32). The horizontal dimensions of the titration vessel 20 and generator 26 and the total volumes of anolyte 22 and catholyte 32 are selected so that several samples can be added to the anolyte 22 and titrated without increasing the height differential more than a few centimeters. The apparatus is conveniently of such dimensions that an increase in volume of anolyte 22 of 100 milliliters will result in a change in height differential increase between the anolyte 22 and catholyte 32 on the order of 0.5 to 3 or 4 centimeters. The anode compartment is continuously vented to the atmosphere via a vent 50 to provide continuous pressure equalization. The pressure equalization provided by open vent 50 contributes to the maintenance of the height differential $\Delta h$.

The indicator electrode assembly 28 and generator 26 are mounted in vessel cover 42, which is removably attached to vessel 20 by appropriate means, e.g., spring clamps 44 which are secured to cover 42 by screws 45. Cover 42 also includes a sample inlet port 46, having an outwardly extending cylindrical wall 47 at its outer end by a membrane 48 which is mounted on inlet wall 47 by a screw cap 49. Membrane 48 is of a suitable material such as rubber, neoprene or the like adapted to provide a moisture and gas barrier between the interior of vessel 20 and the atmosphere, and which can be easily punctured with a syringe for injecting a sample to be titrated into the titration vessel 20. Cover 42 also includes pressure relief means, e.g., tubular air vent 50 extending through cover 42, for providing direct communication and pressure equalization between the interior of vessel 20 and the atmosphere. Capillary vent 50 is preferably of limited dimensions, generally about 2 to about 3 millimeters in diameter, and communicates directly with the atmosphere without a trap, drying tube, dry nitrogen purge or other means for preventing atmospheric moisture from entering vessel 20. Such drying means can be employed with the vent 50, however, in the device on the invention they are neither necessary nor desirable under ordinary conditions of use.

The indicator electrode assembly 28 is a conventional potentiometric electrode pair connected by leads 52, 54 to a constant current source, indicator constant current source 55 for providing a constant current on the order of about 10 to 30 microamperes. The voltage output provided by the indictaor electrode assembly is filtered and buffered to provide a smooth output signal by conventional circuitry indicated by a filter/buffer 56 in FIG. 2. The indicator output voltage signal serves as an input signal for a main level detector 58, and first and second auxiliary level detectors 60, 62. Each of the level detectors 58, 60, 62 is precalibrated to detect the endpoint potential and via appropriate circuitry, to regulate the electrolysis current at the coulometric generator 26.

The output of the main level detector 58 controls the application of coulometric electrolysis current at the generator 26 by means of lamp 64 and a light detector, e.g., photoconductive resistor (PCR) 66. During a coulometric titration, and prior to detection of the endpoint potential signal, lamp 64 is activated, and the PCR 66 responsive to lamp 64 actviates the electrolysis circuit to provide the titration current via the current source 36 and anode and cathode leads 40, 34. The output of the main detector 58 also controls a timer 68, and two signal lights 70, 72. Timer 68 can be driven by a conventional clock motor, and can be calibrated to provide a direct reading in terms of micrograms of water equivalent to the quantity of electricity provided at the coulometric generator 26 by current source 36 in order to titrate a sample to the predetermined endpoint. For example, a constant electrolysis current of 107.1 milliamperes is equivalent to 10 micrograms of water per second titration time in a Karl Fischer titration, and the timer 68 is conveniently selected to provide a digital readout in micrograms of water. Signal light 70 is adapted to remain on during the titration when indicator electrode output signal at main level detector 58 corresponds to potential on the "wet" or pre-completion side of the endpoint, during which time both the timer 68 and current source 36 are activated. Light 72 remains off during the titration when light 70, current source 36, timer 68 and the electrolysis circuit are activated. Light 72 is activated during the titration at times when the indicator output signal corresponds to the endpoint potential, at which times timer 68, light 70, are switched off and the electrolysis current is deactivated by means of lamp 64 and PCR 66. The indicator electrode assembly 28 may sense the endpoint potential at different times during the titration due to such factors as poor miscibility of the sample and the reagent, rate at which a homogeneous titration mixture is achieved, or the difference between the rate at which reagent is generated coulometrically and the rate at which reagent is consumed in the titration reaction. The signal lights 70, 72 thus indicate to an operator the status of the coulometric titration as it proceeds toward the endpoint.

Level detector 58 is also connected via a titration control switch 74 with a delay circuit 75 and latch circuit 76 and another signal light, end light 78. Closing of control switch 74 activates the main titration circuit elements, e.g., main level detector 58, timer 68, lamp 64, latch 76, delay 75 and current source 36, by connnecting them with an appropriate power supply (conventional and not shown). The latch 76 and delay 75 circuitry can be any conventional means for switching off the timer 68, on light 70, lamp 64 (and thus current source 36) and for activating the end light 78 when the main level detector 58 indicates that endpoint potential has been reached and maintained for a predetermined period, such as 60 seconds. For example, the latch 76 can be a silicon controlled rectifier (SCR) latching relay circuit adapted to switch current from timer 68, light 70 and lamp 64 to end light 78 when its gating voltage (supplied by delay circuit 75) reaches a predetermined level. The delay circuit 75 can be a conventional RC timing circuit adapted to charge a capacitor at a predetermined rate so long as the output voltage from the main level detector 58 remains at a level corresponding to the end of the titration. Thus, the delay circuit 75 is activated in response to the appearance of an endpoint signal at detector 58 to delay the activation of the latch 76 for a predetermined period of time, e.g., about one minute, following the appearance of an endpoint signal. If the input signal at detector 58 remains at the endpoint level for the entire delay period, latch 67 is activated to prevent later fluctuations from affecting the timer 62, and signal light 78 is activated to indicate that the titration is complete.

The detailed circuitry of the main level detector 58, timer 62, current source 36, switch 74, latch 76, delay 75, lights 70, 78 and lamp 64 is conventional and not shown.

The device of the invention further includes means for applying an intermittent bipolar electrolysis current at the generator 26 to compensate for both positive and negative baseline drift. With the titration vessel 20 open to the atmosphere via vent 50, moisture in the atmosphere can enter the titration mixture 22 resulting in positive drift of the indicator electrode output signal, toward the "wet" side of the endpoint. Compensation for positive baseline drift is provided by an auxiliary current source 80 connected to cathode and anode leads 34, 40 of the generator 26. The auxiliary current source 80 is adapted to provide a compensating electrolysis current at the coulometric generator 26 when the first auxiliary level detector 60 senses an input signal on the "wet" side of the endpoint. The intermittent auxiliary current is controlled by means of a lamp 28 responsive to detector 69 and a PCR 84.

The device of the invention provides compensation for negative baseline drift by means of a second auxiliary current source 86 connected to cathode and anode leads 34, 40 to provide an electrolysis current opposite in polarity to the current provided by the main current source 36 and the first auxiliary source 89. The second auxiliary current source 86 is controlled by a second level detector 62 by means of lamp 88 and PCR 90. The second level detector 62 is calibrated to activate lamp 88 and thereby auxiliary current source 86 when the output signal from the indicator filter/buffer 56 corresponds to a predetermined potential on the iodine-rich or "dry" side of the endpoint.

The compensating currents provided by auxiliary sources 80, 86 are preferably less than 10 percent of the current generated by the main current source, and neither compensating current registers on the timer. For example, when the main electrolysis current supplied by current source 36 is 107.1 milliamperes, the compensating current provided by auxiliary sources 80, 86 is conveniently on the order of from about ±1 to about ±10 milliamperes, and preferably from about ±3 to about ±5 ma.

The level detectors 58, 60 and 62 employed in the apparatus each exhibit hysteresis in their responses to the input signal from the filter/buffer 56. Preferably each level detector is adapted to inactivate its respective current source in response to the same input signal corresponding to the endpoint state of anolyte 22, and to activate its current source only when the endpoint detector signal has changed (by drift or addition of a sample) to a signal different from the endpoint signal. For example, the hysteresis effect should be sufficient to permit variation on the order of plus or minus from about 2 to about 5 to about 10 millivolts from a potentiometric endpoint without activating the level detectors, the exact amount of variation depending on such factors as the degree of sensitivity and precision desired, sample and anolyte volumes to be used, etc.

Each level detector 58, 60, 62 can comprise a conventional amplifier having an input from filter/buffer 56 and with its reference input connected via a feedback loop of appropriate resistance to the output and via a parallel capacitor and resistor to ground. Selection of appropriate resistances and capacitance will provide the desired hysteresis effects in the level detector outputs. The output of level detectors 58 and 60 can be applied to their respective lamps 64, 82 via conventional means, such as connecting the level detector in a common-emitter configuration to the base of a transistor having the lamp in series with its collector and its emitter connected to ground. The inverse response of negative drift level detector 62 can be similarly provided by connecting the output of detector 62 to the base of a first transistor, the collector of which is connected to the base of a second transistor having lamp 88 in series connection with its collector, to make use of the phase inversion of the two common-emitter transistor connections.

In a preferred apparatus of the invention, excellent results in coulometric Karl Fischer titrations are obtained by titration to a potentiometric endpoint corresponding to a voltage on the order of from about 30 to about 50 millivolts (the higher voltages corresponding to higher endpoint water concentrations). In such an apparatus using a predetermined endpoint corresponding to a potential of about 37 mv., the main level detector 58 is desirably calibrated to activate the electrolysis current source 36 when the voltage at the indicator electrode 28 reaches or rises above about 45 millivolts, and to maintain the current source 36 in operation until the endpoint voltage of about 37 millivolts is attained by the titration. The positive drift level detector 60 is selected to actuate auxiliary current source 80 in response to a potential of about 40 mv. and to inactivate current source 80 when the potential decreases to about 37 millivolts. The negative drift level detector 62 activates its corresponding current source 86 in response to a potential which decreases to about 34 mv. or lower and inactivates auxiliary current source 86 when the potential increases to 37 millivolts. The hysteresis lag provided between the "on" and "off" states of the current sources 36, 80, 86 minimizes fluctuating operation of the device in response to transient potential changes at the indicator electrode 28, such as those resulting from incomplete mixing. The hysteresis lag also ensures the independence of the auxiliary current sources 80, 86 from each other, since both current sources 80, 86 are inactivated at the same endpoint potential, and each can be activated only in response to a predetermined degree of its corresponding component of drift.

The configuration of generator 26 and the use of both the physical barrier of membrane 30 and the hydrostatic pressure barrier across membrane 30, in ordinary use, limit the baseline drift to amounts which correspond to about ±2 to about ±5 micrograms of water per minute, even with continuous direct venting to atmosphere via vent 50. When a titration rate of the order of 10 micrograms of water per second is employed, the amount of baseline drift which can occur during a titration is negligible. Thus, it is necessary only to apply the intermittent auxiliary currents only between titrations. In a convenient embodiment, the auxiliary current sources 80, 86 can be controlled by switch 74, to prevent their operation during a titration. Alternatively, auxiliary sources 80, 86 can be connected to anode lead 40 via appropriate diodes to prevent auxiliary current flow through the anolyte 22 when the anode 38 is at titration potential, that is, when main current source 36 is operating. In the latter embodiment, the auxiliary current can be applied during a titration at times when the main current source 36 has been shut off and before the delay 75 and latch 76 circuits have terminated the titration. In this case, the main level detector 58 and first level detector 60 are preferably calibrated to activate their respective current sources in response to substantially the same signal from the indicator electrode 28. Unreacted water detected in the titration mixture during the delay period provided by the delay 75 and latch 76 circuits will then be titrated by current from the main current source 36, and will register on the timer 68.

From the foregoing description it will be apparent that the improved apparatus of the invention can be modified in various ways by conventional procedures, as may be desired, for example, by using current detecting means for detecting the endpoint, by employing switching means such as relays in lieu of the lamp and photoconductive resistors, or by using a single constant current generator, with appropriately controlled switching and associated circuitry to provide the bipolar compensating currents.

What is claimed is:

1. In an apparatus for coulometric titration of water in a titration mixture according to the Karl Fischer reaction, the apparatus comprising an anode compartment enclosing the titration mixture, an anode in the anode compartment in contact with the titration mixture, a cathode in electrical contact with titration mixture, means for passing an electrolysis current through the titration mixture between the cathode and the anode thereby electrolytically generating iodine in the titration mixture; detector means responsive to the concentration of water in the titration mixture for detecting the endpoint of the titration, and means responsive to the detector means for indicating the quantity of electricity passed through the titration mixture in order to attain said endpoint; the improvement wherein the apparatus further comprises first baseline stabilizing means for selectively passing a first stabilizing current through the titration mixture when the concentration of water in the titration mixture is greater than a predetermined amount corresponding to the endpoint and a second baseline stabilizing means for selectively passing a second stabilizing current, opposite in polarity to the first stabilizing current, through the titration mixture when the concentration of water therein is below a predetermined value corresponding to the endpoint.

2. Apparatus of claim 1 wherein the cathode comprises a cathode body, a liquid catholyte in the cathode body, and porous barrier means on the cathode body for providing electrical contact between the catholyte and the titration mixture, the level of the liquid catholyte being at least about 30 millimeters below the level of the titration mixture, thereby providing a hydrostatic pressure barrier against migration of catholyte across the barrier means.

3. Apparatus of claim 2 further comprising vent means on the anode compartment for continuously venting the anode compartment to the atmosphere.

4. Apparatus of claim 1 wherein the means for passing the electrolysis current through the titration mixture comprises a source of constant titration current; wherein the detector means comprises a potentiometric electrode in contact with the titration mixture; and wherein the means responsive to the detector means comprises a level detector connected to the electrode and adapted to produce an output signal when the output from the electrode corresponds to a predetermined endpoint potential of the titration mixture; switch means responsive to the output of the level detector for operating the constant current source; a timer selectively responsive to the operation of the constant current source for indicating the time during which the constant current source operates; latching circuit means for disconnecting the timer from the constant current source to selectively prevent operation of the timer in response to the constant current source; and delay circuit means responsive to the level detector for activating the latching circuit means after an output signal corresponding to the endpoint has been maintained for a predetermined time interval.

5. Apparatus of claim 4 wherein the first and second baseline stabilizing means comprise a first constant current source connected in parallel with the source of constant titration current; a second constant current source connected in parallel with the source of constant titration current and opposite in polarity thereto; first and second auxiliary level detectors connected to the potentiometric electrode and adapted to produce first and second output signals respectively when the output from the electrode corresponds to first and second predetermined potentials, greater than and less than the endpoint potential, respectively, and first and second switch means responsive to the output signals of the first and second level detectors, respectively, for activating the first and second constant current sources in response to said first and second output signals.

6. Apparatus of claim 2 wherein the anode compartment is substantially opaque to ultraviolet light.

References Cited

UNITED STATES PATENTS 3,131,133  4/1964  Barendrecht _____ 204—195 T

OTHER REFERENCES

Bizot, "Bulletin de la Societe Chemique de France," 1967, No. 1, pp. 151–157.

Meyer et al., "Analytical Chemistry," 1959, vol. 31, pp. 215–219.

Swenson et al., "Analytical Chemistry," 1963, vol. 35, pp. 863–867.

TA-HSUNG TUNG, Primary Examiner

U.S. Cl. X.R.

204—1 T